United States Patent
Lim et al.

(10) Patent No.: US 8,933,991 B2
(45) Date of Patent: Jan. 13, 2015

(54) MOBILE TERMINAL AND CONTROLLING METHOD THEREOF

(75) Inventors: Soo Jung Lim, Seoul (KR); Hak Hae Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 1032 days.

(21) Appl. No.: 13/008,167

(22) Filed: Jan. 18, 2011

(65) Prior Publication Data

US 2012/0026290 A1 Feb. 2, 2012

(30) Foreign Application Priority Data

Jul. 30, 2010 (KR) ........................ 10-2010-0073863

(51) Int. Cl.
| | |
|---|---|
| *H04N 15/00* | (2006.01) |
| *H04N 13/02* | (2006.01) |
| *H04N 13/04* | (2006.01) |
| *H04N 13/00* | (2006.01) |
| *G06T 19/00* | (2011.01) |

(52) U.S. Cl.
CPC ....... *H04N 13/0402* (2013.01); *H04N 13/0239* (2013.01); *H04N 13/0404* (2013.01); *H04N 13/0409* (2013.01); *H04N 13/0429* (2013.01); *H04N 13/0434* (2013.01); *H04N 13/0022* (2013.01); *H04N 13/0452* (2013.01); *H04N 13/0497* (2013.01); *G06T 19/006* (2013.01)
USPC .......................................................... 348/46

(58) Field of Classification Search
CPC .......... H04N 13/0239; H04N 13/0055; H04N 13/0296; H04N 13/0497; H04N 13/0242
See application file for complete search history.

(56) References Cited

U.S. PATENT DOCUMENTS

| | | | |
|---|---|---|---|
| 6,243,054 B1 | 6/2001 | DeLuca | |
| 6,559,813 B1 | 5/2003 | DeLuca | |
| 2010/0194860 A1* | 8/2010 | Mentz et al. | 348/47 |
| 2011/0279446 A1* | 11/2011 | Castro et al. | 345/419 |

* cited by examiner

*Primary Examiner* — Mehrdad Dastouri
*Assistant Examiner* — Kristin Dobbs
(74) *Attorney, Agent, or Firm* — KED & Associates LLP

(57) ABSTRACT

A mobile terminal and controlling method thereof are disclosed, by which object information on an object within a 2-dimensional (hereinafter abbreviated 2D) preview image can be provided as 3D object information of a 3-dimensional (hereinafter abbreviated 3D) type or object information on an object within a 3D preview image can be provided as object information of a 3D type. The present invention includes displaying a preview image via at least one camera on a screen of a touchscreen, recognizing a current position of the mobile terminal, searching for an object information on at least one object within the preview image based on the recognized current position, displaying the found object information within the preview image, and converting and displaying a touched specific point to a 3-dimensional (hereinafter abbreviated 3D) shape if the specific point within the preview image is touched. Accordingly, the present invention converts a preview image for augmented reality to a 2D or 3D image and also converts information on an object within the preview image to a 2D or 3D image, thereby providing a user with various images in the augmented reality.

24 Claims, 20 Drawing Sheets

(a)

(b)

MOBILE TERMINAL AND CONTROLLING METHOD THEREOF

CROSS-REFERENCE TO RELATED APPLICATION(S)

Pursuant to 35 U.S.C. §119(a), this application claims the benefit of earlier filing date and right of priority to Korean Application No. 10-2010-0073863, filed on Jul. 30, 2010, the contents of which are hereby incorporated by reference herein in their entirety.

BACKGROUND

1. Field

The present invention relates to a mobile terminal, and more particularly, to a mobile terminal and controlling method thereof. Although the present invention is suitable for a wide scope of applications, it is particularly suitable for facilitating a user to use a terminal in further consideration of user's convenience.

2. Background

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

Recently, a mobile terminal is equipped with an augmented reality (hereinafter abbreviated AR) function of providing information on an object located within a preview image of a camera.

BRIEF DESCRIPTION OF THE DRAWINGS

The embodiments will be described in detail with reference to the following drawings in which like reference numerals refer to like elements wherein.

DETAILED DESCRIPTION

Figure 1:
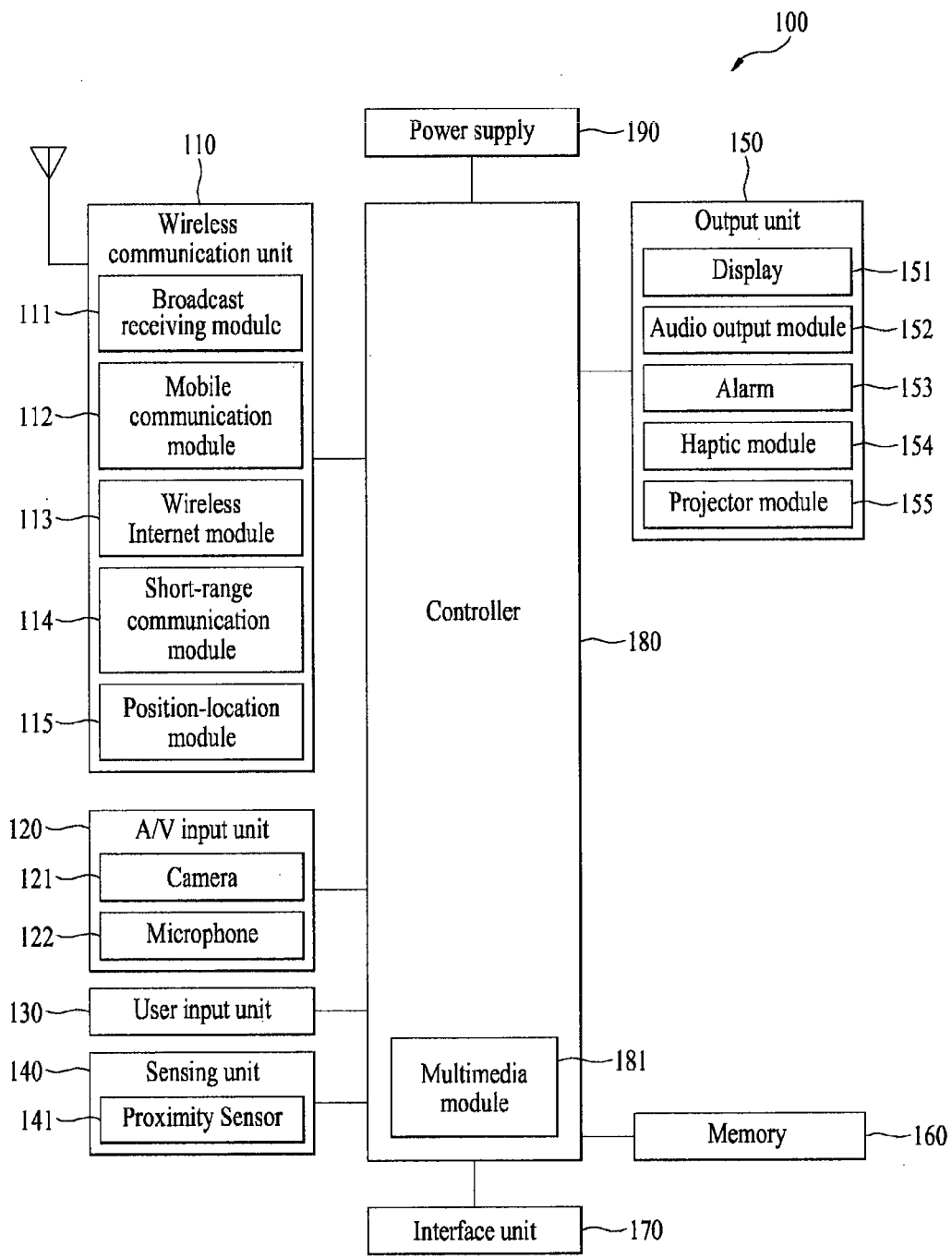
FIG. 1 is a block diagram of a mobile terminal according to one embodiment of the present invention.

Accordingly, the present invention is directed to a mobile terminal and controlling method thereof that substantially obviate one or more problems due to limitations and disadvantages of the related art.

An object of the present invention is to provide a mobile terminal and controlling method thereof, by which object information on an object within a 2-dimensional (hereinafter abbreviated 2D) preview image can be provided as 3D object information of a 3-dimensional (hereinafter abbreviated 3D) type.

Another object of the present invention is to provide a mobile terminal and controlling method thereof, by which object information on an object within a 3D preview image can be provided as object information of a 3D type.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes at least one camera, a position location unit configured to recognize a current position of the mobile terminal, a touchscreen configured to display a preview image by the at least one camera, and a controller configured to search for an object information on the at least one object within the preview image based on the recognized current position of the mobile terminal, to display the found object information, and to convert a touched specific point to a 3-dimensional (hereinafter abbreviated 3D) shape if the specific point within the preview image is touched.

In another aspect of the present invention, a method of controlling a mobile terminal includes the steps of displaying a preview image via at least one camera on a screen of a touchscreen, recognizing a current position of the mobile terminal, searching for an object information on at least one object within the preview image based on the recognized current position, displaying the found object information within the preview image, and converting and displaying a touched specific point to a 3-dimensional shape if the specific point within the preview image is touched.

It is to be understood that both the foregoing general description and the following detailed description of the present invention are exemplary and explanatory and are intended to provide further explanation of the invention as claimed.

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile as well as stationary terminals, such as mobile phones, user equipment, smart phones, DTV, computers, digital broadcast terminals, personal digital assistants, portable multimedia players (PMP) and navigators.

However, by way of non-limiting example only, further description will be with regard to a mobile terminal 100, and it should be noted that such teachings may apply equally to other types of terminals.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

At least two broadcast receiving modules 111 can be provided to the mobile terminal 100 in pursuit of simultaneous receptions of at least two broadcast channels or broadcast channel switching facilitation.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), DVB-CBMS, OMA-BCAST, the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

Moreover, the mobile communication module 112 transmits current position information of the mobile terminal obtained via a position-location module 115, which will be described later, to an external server (not shown in the drawing) and is then able to receive or download data relevant to an area, in which the mobile terminal 100 is located, from the external server.

In this case, detailed map data of the area can be included in the data as well as an image representing the area where the mobile terminal 100 is located.

Moreover, an object information database relevant to objects located within a specific radius of the area can be included in the map data. In this case, the objects can include buildings and the like for example. And, the objects can include hospital, restaurant, toilet, police station, community center and the like, which are located within the buildings.

A real image of each area, position information of objects included within the real image and detailed information on the objects are included in the map data.

In this case, the real image can include an image having the same view of a preview image inputted via the camera 121 or an image corresponding to a sky view.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

Moreover, as mentioned in the foregoing description, the wireless internet module 113 can receive or download the data relevant to the area, in which the mobile terminal 100 is located, from the external server.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

Moreover, as mentioned in the foregoing description, the short-range communication module 114 is able to receive or download the data relevant to the area, in which the mobile terminal 100 is located, from the external server of another terminal located in the vicinity of the mobile terminal 100.

The position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122.

The camera 121 possesses a digital zoom and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

In this case, at least two cameras 121 can be provided according to user environment.

For instance, the camera 121 can include a first camera 121a and a second camera 121b provided for 3D image photographing to a face opposite to another face on which the display unit 151 of the mobile terminal 100 is loaded. And, a third camera 121c for user's self-photographing can be provided to a prescribed region of the face provided with the display unit 151 of the mobile terminal 100.

In this case, the first camera 121a is provided for photographing a left eye image as a source image of a 3D image, while the second camera 121b is provided for photographing a right eye image as a source image of the 3D image, for example.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141 and a motion sensor 142.

The motion sensor 142 detects a body motion of the mobile terminal 100. The motion sensor 142 outputs a signal corresponding to the detected body motion to the controller 180.

The output unit 150 generates outputs relevant to the senses of sight, hearing, touch and the like. And, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and a sensor for detecting a touch action (hereinafter called 'touch sensor') configures a mutual layer structure (hereinafter called 'touchscreen'), it is able to use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Referring to FIG. 1, a proximity sensor (not shown in the drawing) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160.

Moreover, data for various patterns of vibration and/or sound outputted in case of a touch input to the touchscreen can be stored in the memory unit 160.

An object information database for object information on objects (e.g., buildings, shops, road signs, etc.), which can be searched using at least one of pattern recognition information related to an object within a preview image photographed via the camera 121 and position information of the mobile terminal 100 obtained via the position-location module 115, can be stored in the memory 160.

In this case, the object information can include at least one of relevant text information (e.g., a name of the building or shop, etc.), relevant link information (e.g., link information of the building or shop), relevant image information (e.g., an image logo of the building or shop, etc.), and relevant audio information (e.g., a log song of the building or shop, etc.) of the pattern-recognized object.

The object information database stored in the memory 160 can be downloaded or updated from a database of the external server via the wireless communication unit 110.

The object information database stored in the memory 160 can include a whole part of the database downloaded from the external server. Alternatively, the object information database stored in the memory 160 can include a portion of the database downloaded in part from the external server in consideration of the storage capacity of the memory 160.

The portion of the database of the external server is provided for an object located within a predetermined distance from a current position of the mobile terminal 100 or an object located in a predetermined area (e.g., administrative district, etc.) related to a current position of the mobile terminal 100.

A plurality of contact informations including a plurality of counterpart video images are stored in the memory 160. In this case, the contact information can include a name, video image, phone number, email address and fax number of a corresponding counterpart and the like.

Moreover, data of vibrations and sounds of various patterns, which are outputted in case of a touch input applied to the touchscreen, can be stored in the memory 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectable to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2A:
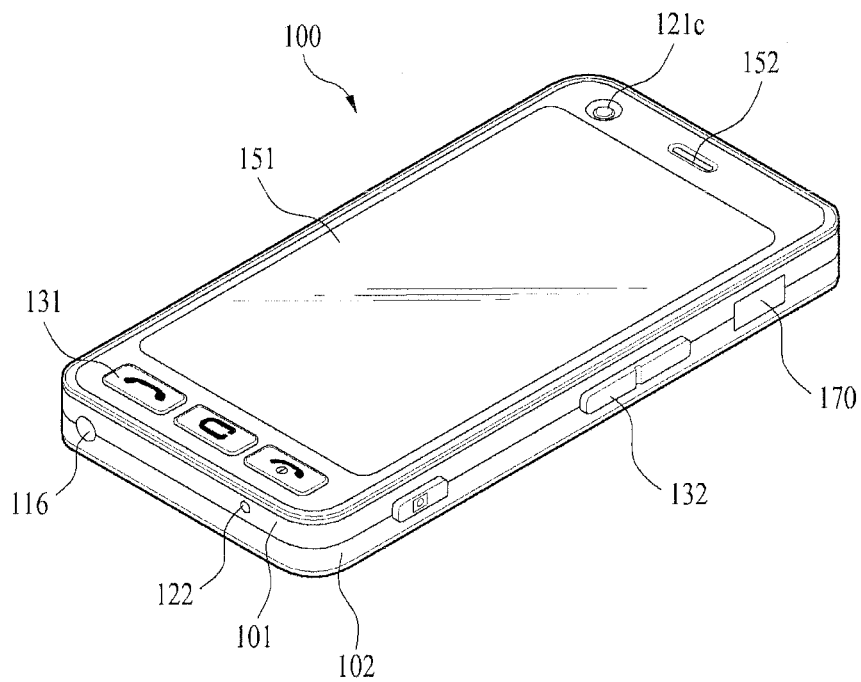
FIG. 2A is a front perspective diagram of a mobile terminal according to one embodiment of the present invention.

FIG. 2A is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the terminal body, and more particularly, to the front case 101.

The display 151 occupies most of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display 151 or the like can be inputted to the second manipulating unit 132.

Figure 2B:
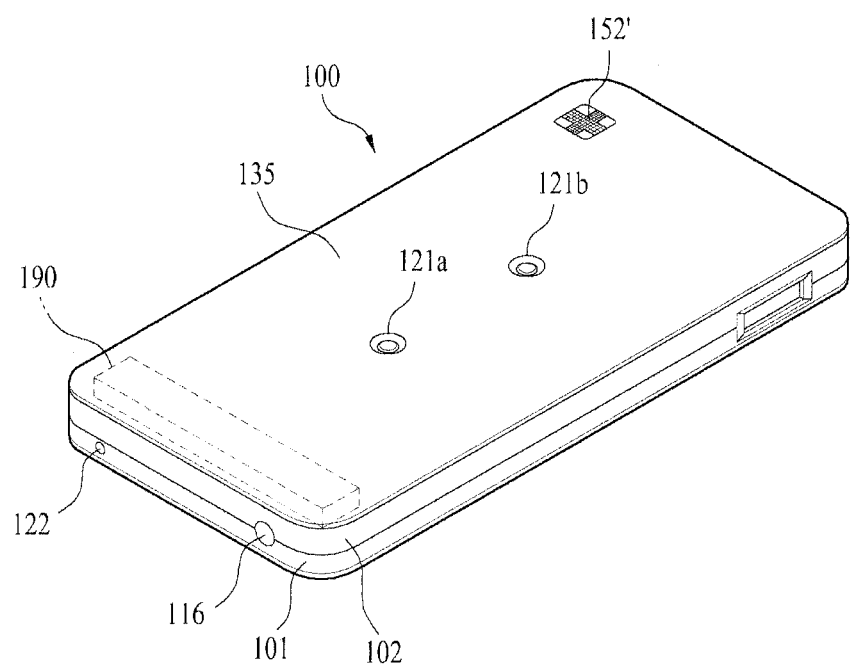
FIG. 2B is a rear perspective diagram of a mobile terminal according to one embodiment of the present invention.

FIG. 2B is a perspective diagram of a backside of the terminal shown in FIG. 2A.

Referring to FIG. 2B, a first camera 121a and a second camera 121b for 3D image photographing can be additionally provided to a backside of the terminal body, and more particularly, to the rear case 102.

In particular, the first and second cameras 121a and 121b are arranged on the straight line within a range not to exceed user's eye distance (e.g., 6.0~6.5 cm). And, a rail 183 enabling the first and second cameras 121a and 121b to move thereon is installed between the first and second cameras 121a and 121b.

Thus, the first and second cameras 121a and 121b can move to each other via the rail 183 under the control of a camera moving unit 182.

In this case, the first and second cameras 121a and 121b enable a normal 2D image photographing as well as the 3D image function. Moreover, a mirror and flash can be further provided around the first and second cameras 121a and 121b (not shown in the drawing).

The flash projects light toward a subject in case of photographing the subject using the first and second cameras 121a and 121b. In case that a user attempts to take a picture of himself (self-photographing) using the first and second cameras 121a and 121b, the mirror enables the user to view his face reflected by the mirror.

Meanwhile, each of the first and second cameras 121a and 121b has a photographing direction substantially opposing that of the third camera 121c and may have pixels identical to or different from those of the third camera 121c.

Preferably, for instance, the third camera 121c has low pixels enough to photograph and transmit a picture of user's face for a video call and the like, while each of the first and second cameras 121a and 121b has high pixels for photographing a general subject without transmitting the photographed subject instantly.

An additional audio output unit 152' can be provided to the backside of the terminal body. The additional audio output unit 152' is able to implement a stereo function together with the former audio output unit 152 shown in FIG. 2A and may be used for implementation of a speakerphone mode in talking over the terminal.

A broadcast signal receiving antenna 124 can be additionally provided to the lateral side of the terminal body as well as an antenna for communication or the like. The antenna 124 constructing a portion of the broadcast receiving module 111 shown in FIG. 1 can be retractably provided to the terminal body.

A power supply unit 190 for supplying a power to the terminal 100 is provided to the terminal body. And, the power supply unit 190 can be configured to be built within the terminal body. Alternatively, the power supply unit 190 can be configured to be detachably connected to the terminal body.

A touchpad 135 for detecting a touch can be additionally provided to the rear case 102. The touchpad 135 can be configured in a light transmittive type like the display 151. In this case, if the display 151 is configured to output visual information from its both faces, it is able to recognize the visual information via the touchpad 135 as well. The information outputted from both of the faces can be entirely controlled by the touchpad 135. Alternatively, a display is further provided to the touchpad 135 so that a touchscreen can be provided to the rear case 102 as well.

The touchpad 135 is activated by interconnecting with the display 151 of the front case 101. The touchpad 135 can be provided in rear of the display 151 in parallel. The touchpad 135 can have a size equal to or smaller than that of the display 151.

In the following description, a method of controlling a 3D image in a mobile terminal applicable to embodiments of the present invention is explained.

Stereoscopic images implemented on the display unit 151 of the mobile terminal 100 according to the present invention can be mainly classified into two kinds of categories. In this case, the reference of this classification relates to whether different images are provided to both eyes, respectively. The first stereoscopic image category is described as follows, First of all, the first category is a monoscopic scheme of providing the same image to both eyes and is advantageous in that it can be implemented with a general display unit 151. In particular, the controller 180 arranges a polyhedron generated from combining at least one of dots, lines, surfaces or combination thereof in a virtual 3D space and enables an image, which is generated from seeing the polyhedron in a specific view, to be displayed on the display unit 151. Therefore, such a 3D image can substantially include a planar image (2D image).

Secondly, the second category is a stereoscopic scheme of providing different image to both eyes, respectively, which uses the principle that a user can sense a stereoscopic effect in looking at an object with human eyes. In particular, human eyes are configured to see different planar images in looking at the same object due to a distance between both eyes. These different images are forwarded to a human brain via retinas. The human brain is able to sense depth and reality of a 3D image by combining the different images together. Therefore, the binocular disparity attributed to the distance between both of the eyes enables the user to sense the stereoscopic effect despite that there is an individual difference of the binocular disparity more or less. Therefore, the binocular disparity becomes the most important factor of the second category.

The binocular disparity is explained in detail with reference to FIG. 3 as follows.

Figure 3:
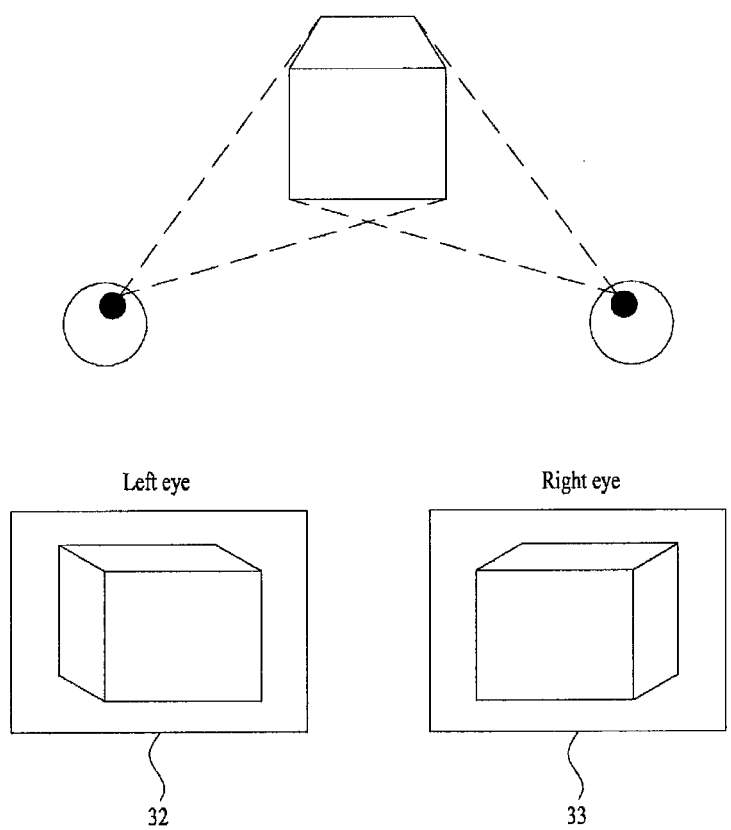
FIG. 3 is a diagram for explaining the principle of binocular disparity.

FIG. 3 is a diagram for explaining the principle of binocular disparity.

Referring to FIG. 3, assume a situation that a hexahedron 31 is positioned as a subject in front below an eye's height to be seen through human eyes. In this case, a left eye is able to see a left eye planar image 32 revealing three facets including a top side, a front side and a left lateral side of the hexahedron 31 only. And, a right eye is able to see a right eye planar image 33 revealing three facets including the top side the front side and a right lateral side of the hexahedron 31 only.

Even if a real thing is not actually positioned in front of both eyes of a user, if the left eye planar image 32 and the right eye planar image 33 are set to arrive at the left eye and the right eye, respectively, a user is able to substantially sense the hexahedron 31 as if looking at the hexahedron 31 actually.

Thus, in order to implement the 3D image belonging to the second category in the mobile terminal 100, images of the same object should arrive at both eyes in a manner of being discriminated from each other for the left and right eye images of the same object with a predetermined parallax.

In the following description, 3D depth attributed to the binocular disparity (parallax) is explained with reference to FIG. 4.

Figure 4:
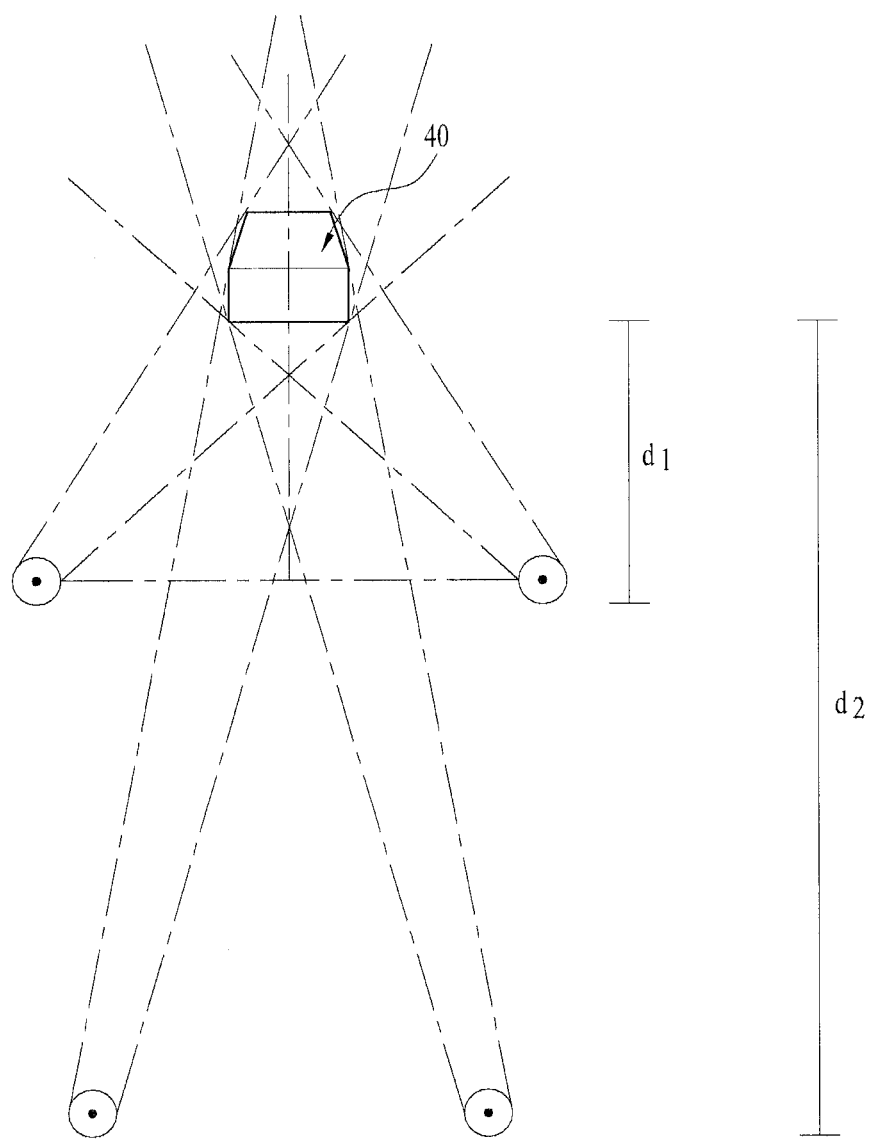
FIG. 4 is a diagram for concept of a sense of distance and 3D depth attributed to binocular disparity.

FIG. 4 is a diagram for concept of a sense of distance and 3D depth.

Referring to FIG. 4, a lateral side ratio of an image entering each eyeball in view of a hexahedron 40 in a distance d1 trough both eyes is relatively higher than that in a distance d2, whereby a difference between images seen through both eyes increases. Moreover, an extent of a stereoscopic effect sensed by a user in view of the hexahedron 40 in the distance d1 can become higher than that in view of the hexahedron 40 in the distance d2. In particular, when a thing is seen through both eyes of a user, a closer subject gives a greater stereoscopic effect, whereas a farther subject gives a smaller stereoscopic effect.

Such a difference in stereoscopic effect can be digitized into a 3D depth or a 3D level.

A method of implementing a 3D stereoscopic image is described as follows.

As mentioned in the following description, in order to implement a 3D stereoscopic image, an image for a right eye and an image for a left eye need to arrive at both eyes in a manner of being discriminated from each other. For this, various methods are explained as follows.

1) Parallax Barrier Scheme

The parallax barrier scheme enables different images arrive at both eyes in a manner of controlling a propagating direction of light by electronically driving a cutoff device provided between a general display and both eyes. This is explained with reference to FIG. 4 as follows.

Figure 5:
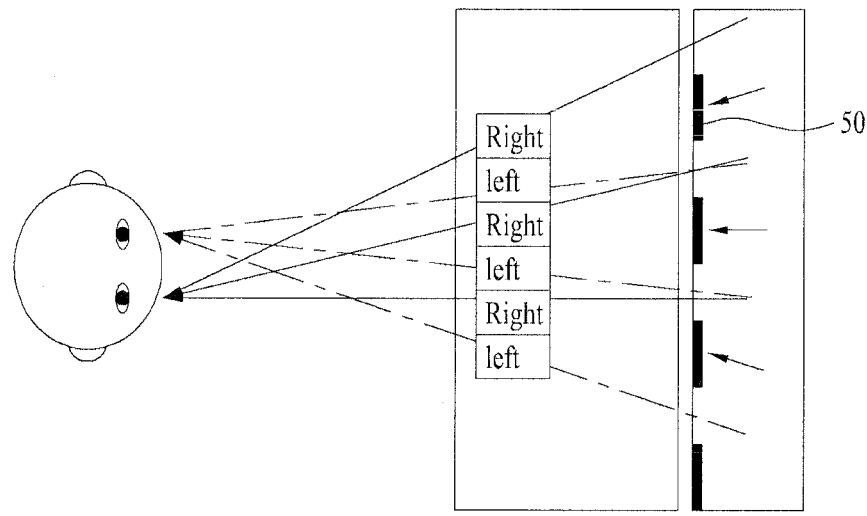
FIG. 5 is a diagram for a scheme of implementing a 3D stereoscopic image in a display unit of a parallax barrier type applicable to embodiments of the present invention.
Figure 5:
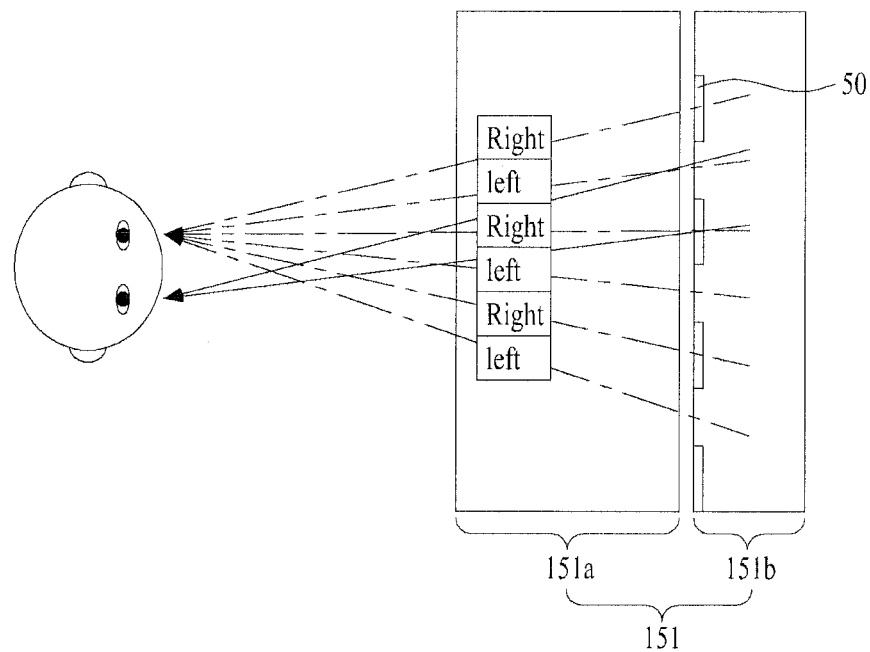

FIG. 5 is a diagram for a scheme of implementing a 3D stereoscopic image in a display unit of a parallax barrier type applicable to embodiments of the present invention.

Referring to FIG. 5, a structure of a parallax barrier type display unit 151 for displaying a 3D image can be configured in a manner that a general display device 151a is combined with a switch LC (liquid crystals) 151b. A propagating direction of light is controlled by activating an optical parallax barrier 600, as shown in FIG. 5 (a), using the switch LC 151b, whereby the light is separated into two different lights to arrive at left and right eyes, respectively. Thus, when an image generated from combining an image for the right eye and an image for the left eye together is displayed on the display device 151a, a user sees the images corresponding to the eyes, respectively, thereby feeling the 3D stereoscopic effect.

Alternatively, referring to FIG. 5 (b), the parallax barrier 600 attributed to the switch LC is electrically controlled to enable entire light to be transmitted therethrough, whereby the light separation due to the parallax barrier is avoided. Therefore, the same image can be seen through left and right eyes. In this case, the same function of a conventional display unit is available.

In particular, FIG. 5 exemplarily shows that the parallax barrier performs parallel translation in one axial direction, by which the present invention is non-limited. Alternatively, the present invention is able to use a parallax barrier that enables parallel translation in at least two axial directions according to a control signal from the controller 180.

2) Lenticular

The lenticular scheme relates to a method of using a lenticular screen provided between a display and both eyes. In particular, a propagating direction of light is refracted via lens on the lenticular screen, whereby different images arrive at both eyes, respectively.

3) Polarized Glasses

According to the polarized glasses scheme, polarizing directions are set orthogonal to each other to provide different images to both eyes, respectively. In case of circular polarization, polarization is performed to have different rotational direction, whereby different images can be provided to both eyes, respectively.

4) Active Shutter

This scheme is a sort of the glasses scheme. In particular, a right eye image and a left eye image are alternately displayed on a display unit with prescribed periodicity. And, user's glasses close its shutter in an opposite direction when an image of a corresponding direction is displayed. Therefore, the image of the corresponding direction can arrive at the eyeball in the corresponding direction. Namely, while the left eye image is being displayed, a shutter of the right eye is closed to enable the left eye image to arrive at the left eye only. On the contrary, while the right eye image is being displayed, a shutter of the left eye is closed to enable the right eye image to arrive at the right eye only.

In the following description, assume that a mobile terminal according to one embodiment of the present invention is able to provide a user with a 3D stereoscopic image via the display unit 151 by one of the above described methods.

Since the 3D image principle described with reference to FIG. 4 and FIG. 5 assumes a stereoscopic object, the object in a left eye image differs from the object in a right eye image in shape.

Yet, if an object is not a stereoscopic object but a planar object, a shape of the object in a left eye image is identical to that of the object in a right eye image. If a position of the object in the left eye image is different from that of the object in the right eye image, a user is able to view the corresponding object in the perspective. To help the understanding of this disclosure, assume that a stereoscopic image in the following description is a planar object. Of course, it is apparent to those skilled in the art that the present invention is applicable to a stereoscopic object as well.

[First Embodiment]

A first embodiment of the present invention relates to a process for providing object information on an object within a 2D preview image for augmented reality as 3D object information.

Figure 6:
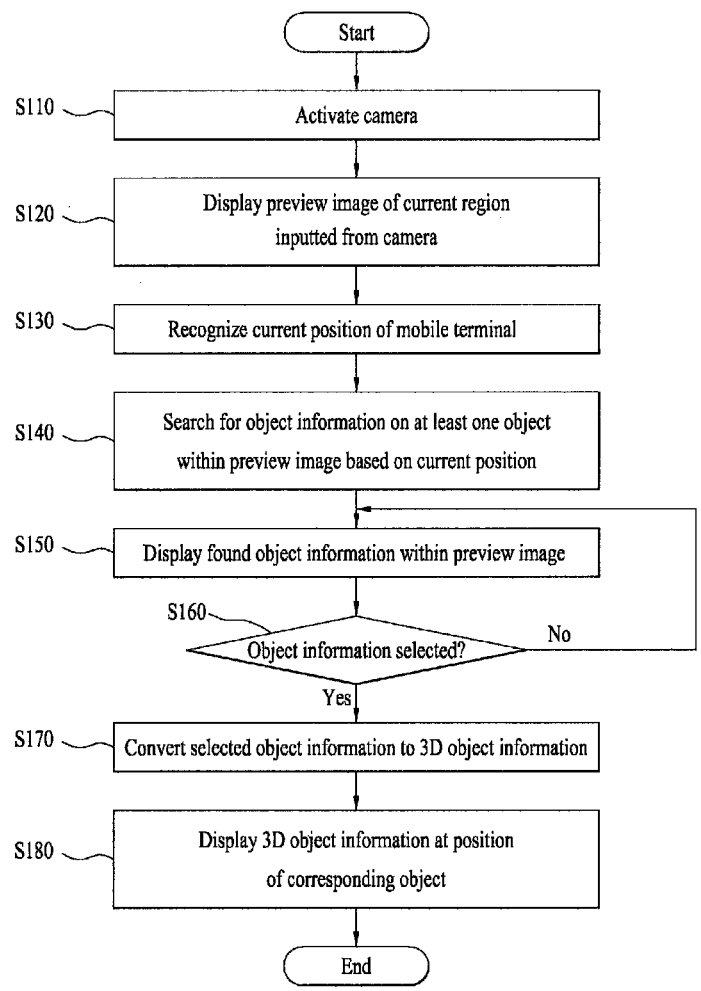
FIG. 6 is a flowchart of a process for providing 3D object information within a 2D preview image for augmented reality according to the present invention.

FIG. 6 is a flowchart of a process for providing 3D object information within a 2D preview image for augmented reality according to the present invention.

Referring to FIG. 6, if a menu function for augmented reality is selected by a user, the controller 180 of the mobile terminal 100 activates the camera [S110] and then controls a preview image 300A of a current area, which is inputted via the activated camera 121, to be displayed on the touchscreen 151 [S120].

In this case, since the preview image is a 2D image 300A in the first embodiment of the present invention, the controller 180 activates one of the first to third cameras 121a, 121b and 121c and then controls a 2D preview image 300A to be displayed.

In the following description, assume that the 2D preview image 300A is inputted via the first camera 121a among the first to third cameras 121a, 121b and 121c.

Subsequently, the controller 180 recognizes a current position of the mobile terminal 100 via the position location module 115 [S130]. In particular, the position location module 115 receives position information containing latitude, longitude, altitude, direction and the like of the mobile terminal 100 from a satellite under the control of the controller 180.

Based on the recognized current position of the mobile terminal 100, the controller 180 searches for object informations 311A and 321A on at least one or more objects 310A and 320A existing within the 2D preview image 300A.

In this case, the object information contains a name, contact, detailed position and the like of the corresponding object.

Meanwhile, the controller 180 is able to search an object information database within the memory 160 for object informations 311A and 321A on at least one or more objects 310A and 320A existing within the 2D preview image 300A.

The controller 180 accesses an external server via the wireless communication unit 110, searches an object information database provided to the external server for object informations 311A and 321A on at least one or more objects 310A and 320A existing within the 2D preview image 300A, and is then able to download the found object informations.

The controller 180 recognizes shapes of at least one or more objects 310A and 320A existing within the 2D preview image 300A and is then able to search the object information database within the memory 160 for object informations 311A and 321A corresponding to the recognized shapes, respectively.

The controller 180 recognizes shapes of at least one or more objects 310A and 320A existing within the 2D preview image 300A, searches the object information database provided to the external server for object informations 311A and 321A corresponding to the recognized shapes via the wireless communication unit 110, and is then able to download the found informations via the wireless communication unit 110.

As mentioned in the above description, if the object informations 311A and 321A on at least one or more objects 310A and 320A existing within the 2D preview image 300A are found from the object information database, the controller 180 controls the found object informations 311A and 321A to be displayed at the positions of the corresponding objects 310A and 320A within the 2D preview image 300A by the augmented reality scheme [S150].

Subsequently, if at least one 311A of the displayed informations 311A and 321A is selected [S160], the controller 180 converts the selected object information 311A to a 3D object information 311B of a 3D type [S170] and then controls the corresponding 3D object information 311B to be displayed at the position of the corresponding object 310A.

In doing so, left and right eye image sources for the 3D conversion of the selected object information 311A are provided within the object information database. And, the controller 180 converts the selected object information 311A to the 3D object information 311B using the left and right eye image sources of the selected object information 311A.

If the object information 311A is selected, the controller 180 additionally activates the second camera 121b wile the first camera 121a is activated. The controller 180 obtains left and right eye images for the selected object information 311A via the first and second cameras 121a and 121b and is then able to convert the selected object information 311A to the 3D object information 31B using the obtained left and right eye images.

The controller 180 is able to convert the selected object information 311A to the 3D object information 311B via 3D conversion application provided within the memory 160.

After the object information 311A has been converted to the 3D object information 311B, if a command for image photographing of the preview image 300A is inputted, the controller 180 takes a preview image including the 3D object information 311B and then stores the taken preview image in the memory 160.

In doing so, the controller 180 synthesizes the 3D object information 311B with the taken preview image 300A and then stores the synthesized image. Alternatively, the controller 180 is able to store the taken preview image 300A and the 3D object information 311B as separate files, respectively.

In particular, in order to separately store the preview image 300A and the 3D object information 311B, the controller stores the preview image 300A and the 3D object information 311B by linking them to each other. When the stored preview image 300A is executed and displayed, the controller 180 is able to display the stored preview image 300A and the linked 3D object information 311B together.

Figure 7:
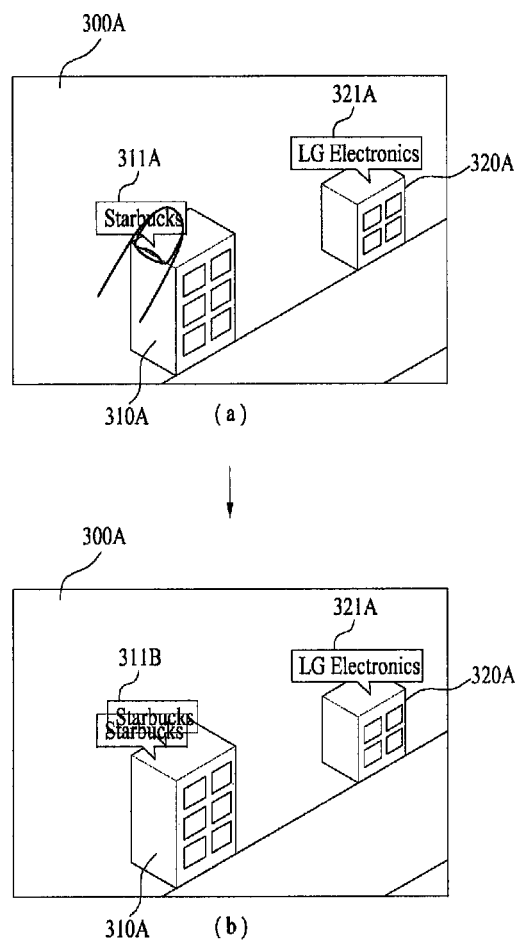
FIGS. 7 to 9 are diagrams of screen configurations for a method of providing 3D object information within a 2D preview image for augmented reality according to a first embodiment of the present invention.
Figure 8:
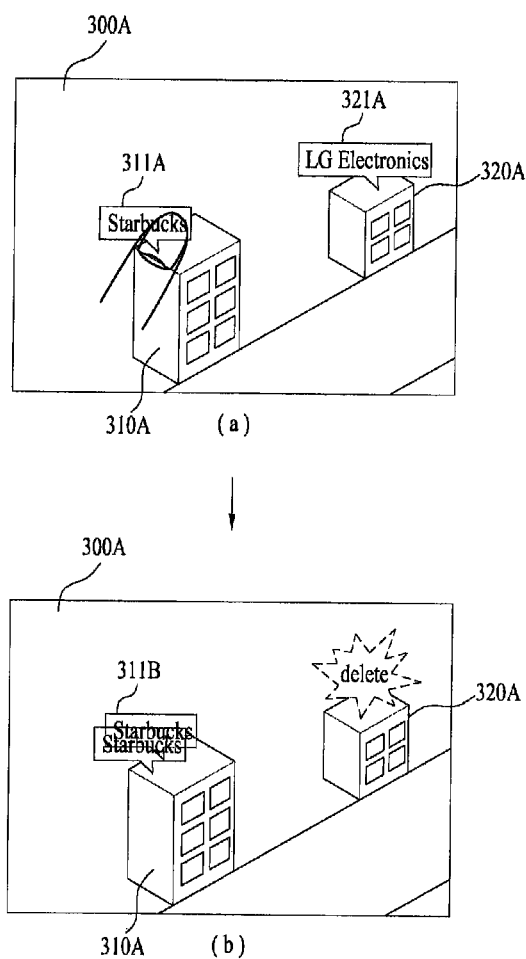
Figure 9:
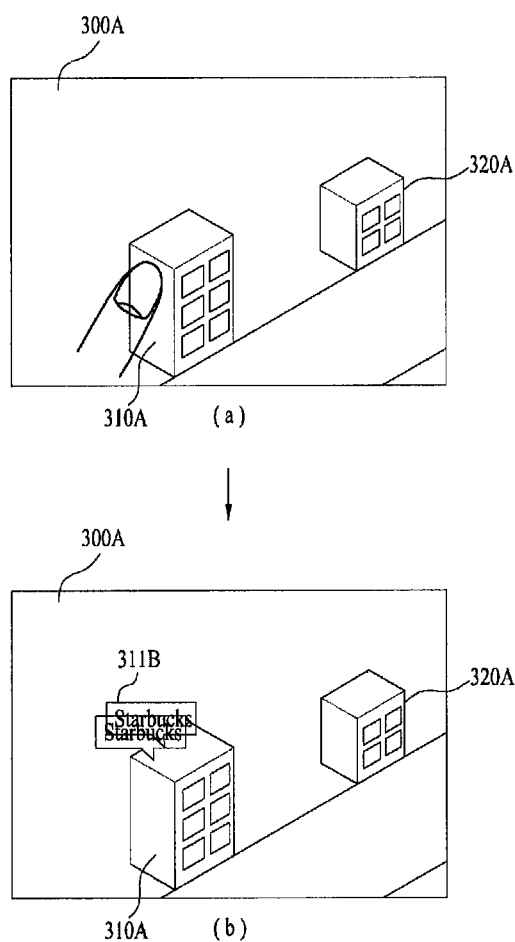

FIGS. 7 to 9 are diagrams of screen configurations for a method of providing 3D object information within a 2D preview image for augmented reality according to a first embodiment of the present invention.

Referring to FIG. 7 (a), a 2D preview image 300A is displayed on the touchscreen 151. A first object 310A and a second object 320A exist within the 2D preview image 300A. First object information 311A on the first object 310A and second object information 321A on the second object 320A are displayed on the first object 310A and the second object 320A, respectively.

If the first object information 311A is selected [FIG. 7 (a)], the controller 180 converts the first object information 311A to a 3D object information 311B and then displays the 3D object information 311B [FIG. 7 (b)].

Moreover, after the first object information 311A has been converted to the 3D object information 311B, if the 3D object information 311B is selected again, the controller 180 is able to convert the 3D object information 311B to the first object information 311A [not shown in the drawing].

Referring to FIG. 8 (a) and FIG. 8 (b), if the first object information 311A is selected, the controller 180 converts the first object information 311A to the 3D object information 311B and then displays the 3D object information 311B. And, the controller 180 is able to stop displaying the rest of the object information 321A within the 2D preview image 300A except the 3D object information 311B.

Referring to FIG. 9, while object informations 311A and 321A are not displayed within a 2D preview image 300A, if a first object 310A within the 2D preview image is selected, the controller 180 directly converts the first object information 311A on the selected first object 310A to a 3D object information 311B and then displays the corresponding 3D object information 311B.

In particular, referring to FIG. 9 (a), while a 2D preview image 300A containing first object 310A and a second object 320A is displayed, if the first object 310A is selected, the controller 180 searches an object information database provided to the memory 160 or the external server for a first object information 311A corresponding to the selected first object 310A. Referring to FIG. 9 (b), the controller 180 converts the fund first object information 311A to a 3D object information 311B and then displays the 3D object information 311B.

Figure 10:
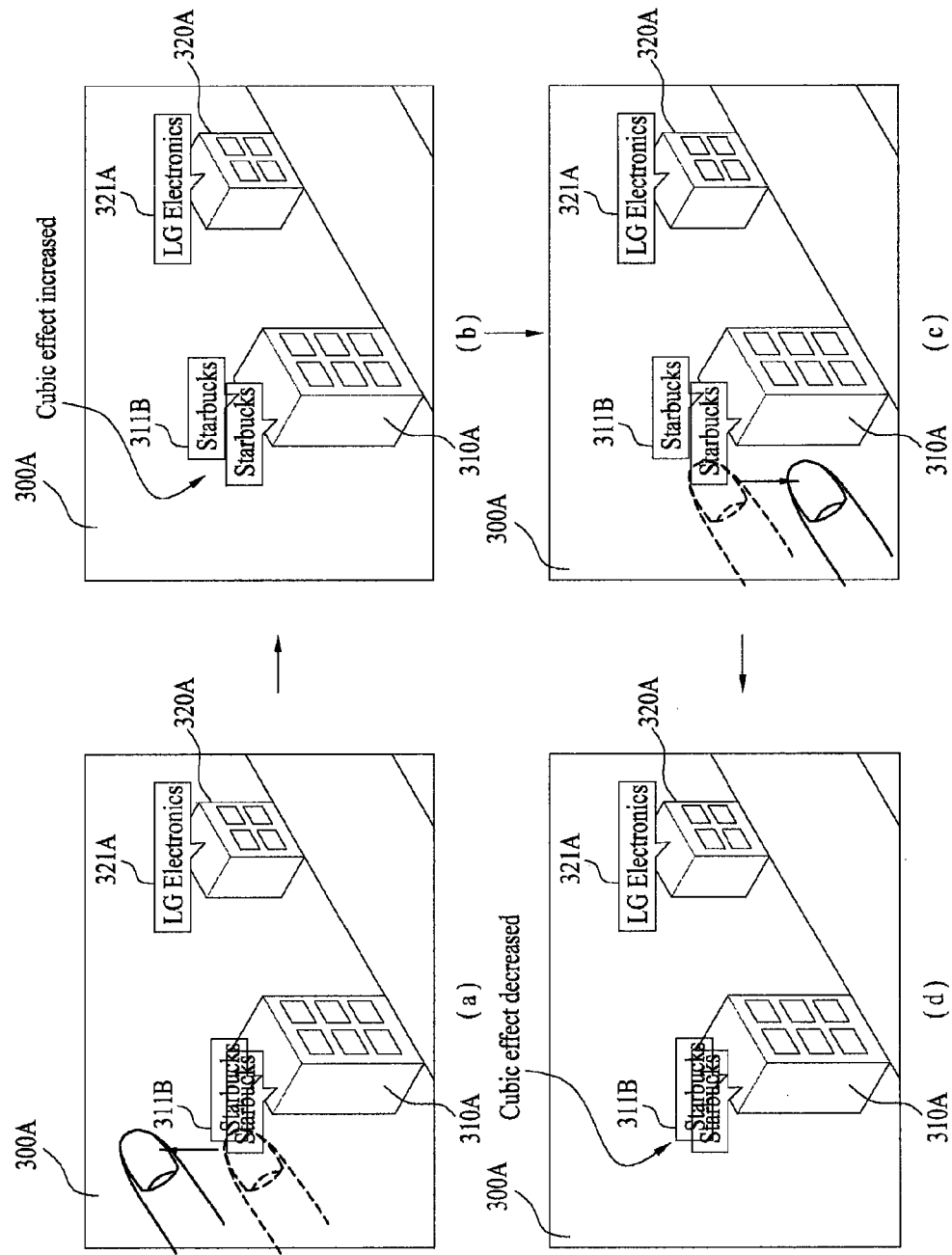
FIGS. 10 to 12 are diagrams for a method of changing a shape of 3D object information according to a first embodiment of the present invention.
Figure 11:
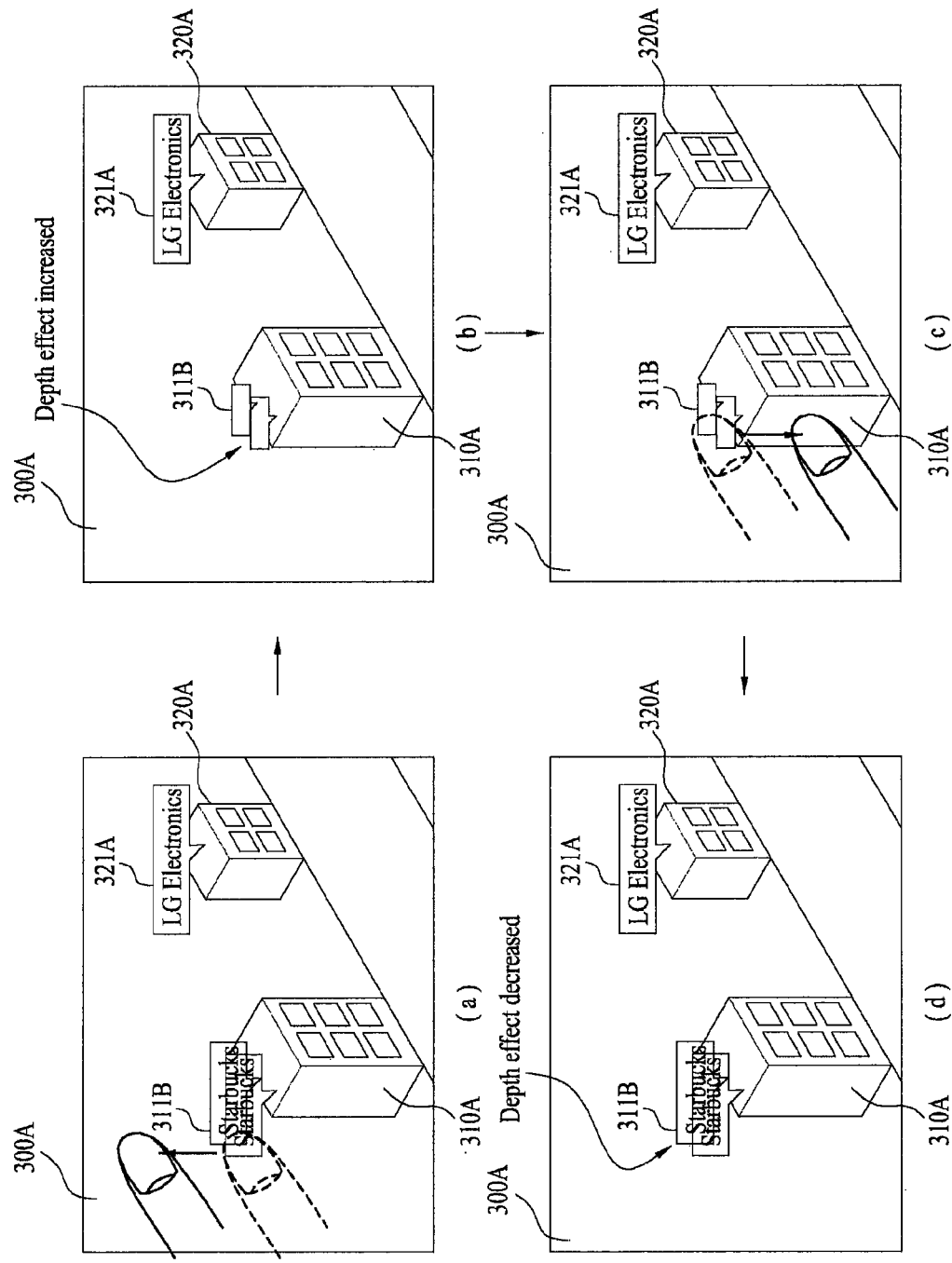
Figure 12:
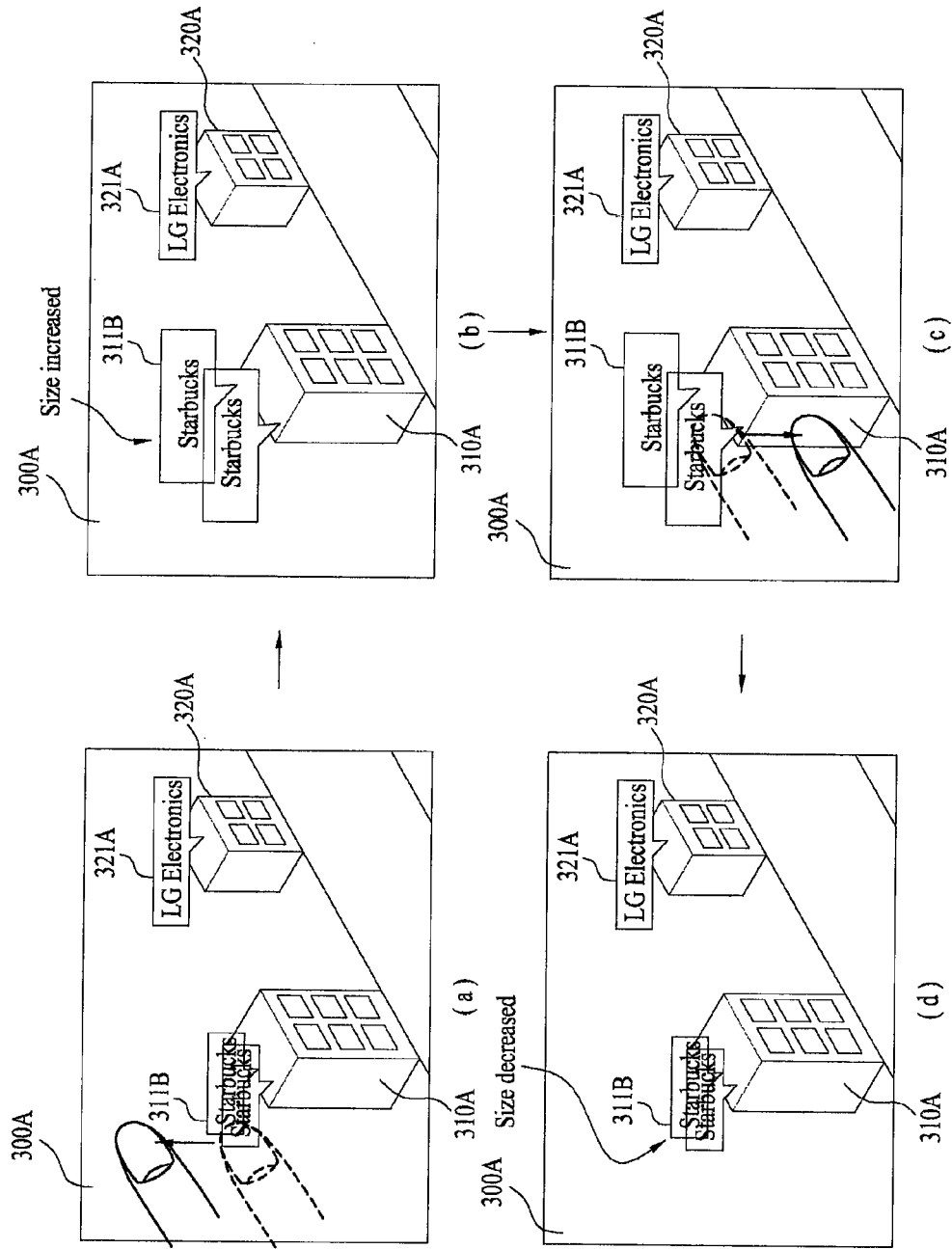

Meanwhile, it is able to change a 3D shape of the 3D object information 311B according to the process shown in one of FIGS. 6 to 9 into one of shown in FIGS. 10 to 12 to correspond to a user's touch manipulation.

FIGS. 10 to 12 are diagrams for a method of changing a shape of 3D object information according to a first embodiment of the present invention.

FIG. 10 shows that a cubic effect level of the 3D object information 311B is changed to correspond to a user's touch manipulation. In FIG. 10, the cubic effect means a 3D effect according to binocular disparity of a user.

In particular, in case of detecting a user's drag (or flicking) touch to a 3D object information 311B, the controller 180 calculates a variation of the detected drag touch and then changes the 3D cubic effect level of the 3D object information 311B to correspond to the calculated variation.

In doing so, a direction of the drag touch can include one of a top direction, a bottom direction, a left direction, a right direction and a diagonal direction.

Referring to FIG. 10, if a drag touch is performed on the 3D object information 311B in the top direction [FIG. 10 (a)], the controller 180 raises the cubic effect level of the 3D object information 311B to correspond to a distance of the top-direction drag [FIG. 10 (b)].

After the cubic effect level of the 3D object information 311B has been raised, if a drag touch in a bottom direction is detected [FIG. 10 (c)], the controller 180 lowers the cubic effect level of the 3D object information 311B to correspond to a distance of the bottom-direction drag [FIG. 10 (d)].

Besides, if a drag touch is performed on the 3D object information 311B in a left or right direction, the controller 180 is able to raise or lower the cubic effect level of the 3D object information 311B [not shown in FIG. 10].

FIG. 11 shows that a depth effect level of the 3D object information 311B is changed to correspond to a user's touch manipulation.

In this case, a 3D object, which is felt closer on a screen by a user, has a low 3D depth effect level. And, a 3D object, which is felt farther on a screen by a user, has a high 3D depth effect level.

Referring to FIG. 11, if a drag touch is performed on the 3D object information 311B in the top direction [FIG. 11 (a)], the controller 180 raises the depth effect level of the 3D object information 311B to correspond to a distance of the top-direction drag [FIG. 11 (b)].

After the depth effect level of the 3D object information 311B has been raised, if a drag touch in a bottom direction is detected [FIG. 11 (c)], the controller 180 lowers the depth effect level of the 3D object information 311B to correspond to a distance of the bottom-direction drag [FIG. 11 (d)].

Besides, if a drag touch is performed on the 3D object information 311B in a left or right direction, the controller 180 is able to raise or lower the depth effect level of the 3D object information 311B [not shown in FIG. 11].

FIG. 12 shows that a size of the 3D object information 311B is changed to correspond to a user's touch manipulation.

Referring to FIG. 12, if a drag touch is performed on the 3D object information 311B in the top direction [FIG. 12 (a)], the controller 180 increases a size of the 3D object information 311B to correspond to a distance of the top-direction drag [FIG. 12 (b)].

After the size of the 3D object information 311B has been increased, if a drag touch in a bottom direction is detected [FIG. 12 (c)], the controller 180 decreases the size of the 3D object information 311B to correspond to a distance of the bottom-direction drag [FIG. 12 (d)].

Besides, if a drag touch is performed on the 3D object information 311B in a left or right direction, the controller 180 is able to increase or decrease the size of the 3D object information 311B [not shown in FIG. 12].

[Second Embodiment]

A second embodiment of the present invention relates to a process for providing object information on an object within a 3D preview image for augmented reality as 3D object information.

Figure 13:
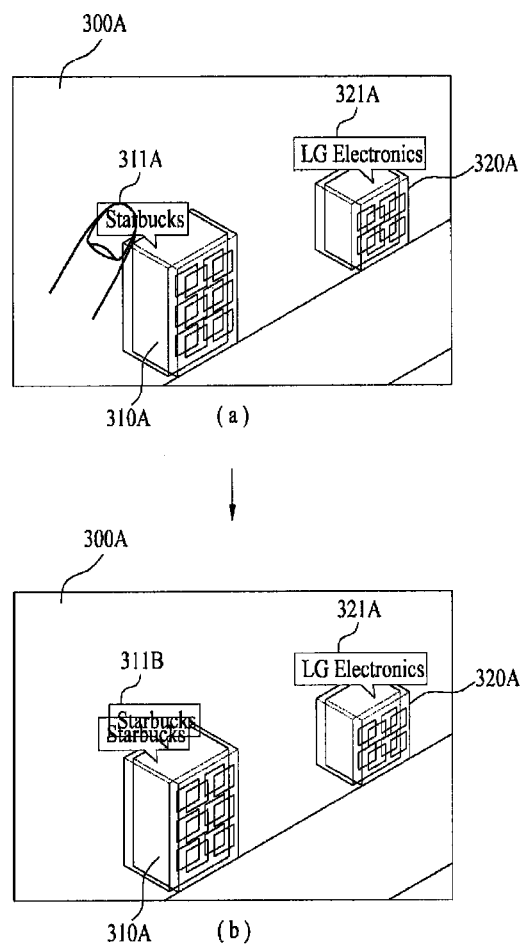
FIG. 13 is a diagram of screen configuration for a method of providing 3D object information within a 3D preview image for augmented reality according to a second embodiment of the present invention.

FIG. 13 is a diagram of screen configuration for a method of providing 3D object information within a 3D preview image for augmented reality according to a second embodiment of the present invention;

Referring to FIG. 13 (a), if a menu function for augmented reality is selected by a user, the controller 180 of the mobile terminal 100 activates the camera 121 and then controls a preview image of a current area, which is inputted via the activated camera 121, to be displayed on the touchscreen 151.

In this case, since the preview image is a 3D image 300B in the second embodiment of the present invention, the controller 180 activates both of the first and second cameras 121a and 121b, generates a preview image of a 3D type using left and right eye images inputted from the first and second cameras 121a and 121b, and then displays the 3D preview image 300B.

Subsequently, the controller 180 recognizes a current position of the mobile terminal 100 via the position location module 115. In particular, the position location module 115 receives position information containing a latitude, longitude, altitude, direction and the like of the mobile terminal 100 from a satellite under the control of the controller 180.

Based on the recognized current position of the mobile terminal 100, the controller 180 searches for object informations 311A and 321A on at least one or more objects 310B and 320B existing within the 3D preview image 300B. In this case, the object information contains a name, contact, detailed position and the like of the corresponding object.

Meanwhile, the controller 180 is able to search an object information database within the memory 160 for object informations 311A and 321A on at least one or more objects 310B and 320B existing within the 3D preview image 300B.

The controller 180 accesses an external server via the wireless communication unit 110, searches an object information database provided to the external server for object informations 311A and 321A on at least one or more objects 310B and 320B existing within the 3D preview image 300B, and is then able to download the found object informations 311A and 321A.

The controller 180 recognizes shapes of at least one or more objects 310B and 320B existing within the 3D preview image 300B and is then able to search the object information database within the memory 160 for 2D object informations 311A and 321A corresponding to the recognized shapes, respectively.

The controller 180 recognizes shapes of at least one or more objects 310B and 320B existing within the 3D preview image 300B, searches the object information database provided to the external server for 2D object informations 311A and 321A corresponding to the recognized shapes via the wireless communication unit 110, and is then able to download the found informations via the wireless communication unit 110.

As mentioned in the above description, if the object informations 311A and 321A on the at least one or more objects 310B and 320B existing within the 3D preview image 300B are found from the object information database, the controller 180 controls the found 2D object informations 311A and 321A to be displayed at the positions of the corresponding objects 310B and 320B within the 3D preview image 300B by the augmented reality scheme.

Subsequently, if at least one 311A of the displayed 2D object informations 311A and 321A is selected, the controller 180 converts the selected 2D object information 311A to a 3D object information 311B of a 3D type and then controls the corresponding 3D object information 311B to be displayed at the position of the corresponding object 310B.

In this case, as mentioned in the foregoing description with reference to FIG. 8, the controller 180 is able to stop displaying the rest of the object information 321A except the 3D object information 311B within the 3D preview image 300B.

Moreover, as mentioned in the foregoing description with reference to FIG. 9, while the object informations 311A and 321A are not displayed within the 3D preview image 300B, if the first object 310B within the 3D preview image 300B is selected, the controller 180 directly converts the first object information 311A on the first object 310B to the 3D object information 311B and is then able to display the 3D object information 311B.

Besides, the controller 180 is able to change at least one of the cubic effect level, the depth effect level and the size of the 3D object information 311B according to one of the aforesaid processes shown in FIGS. 6 to 9.

[Third Embodiment]

A third embodiment of the present invention relates to a process for providing a 3D object and object information within a 2D preview image for augmented reality.

Figure 14:
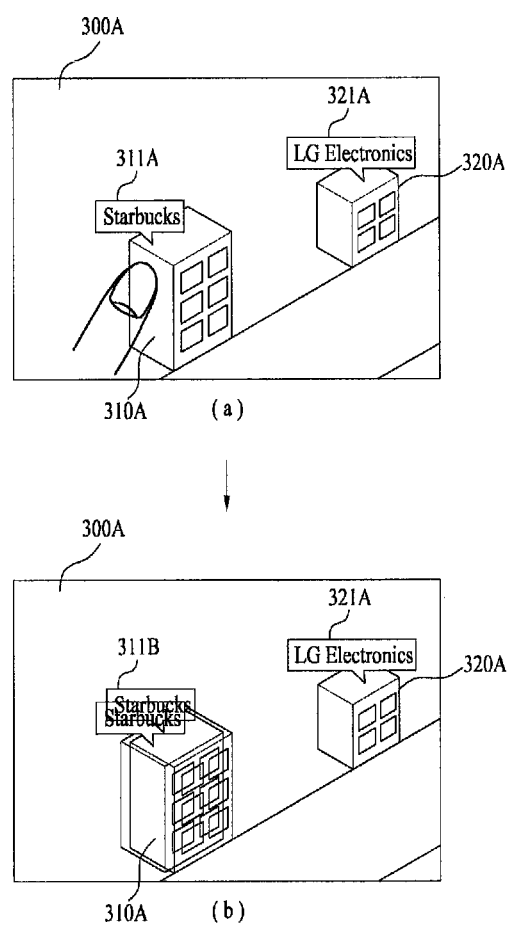
FIG. 14 and FIG. 15 are diagrams of screen configurations for a method of providing a 3D object and 3D object information within a 2D preview image for augmented reality according to a third embodiment of the present invention.
Figure 15:
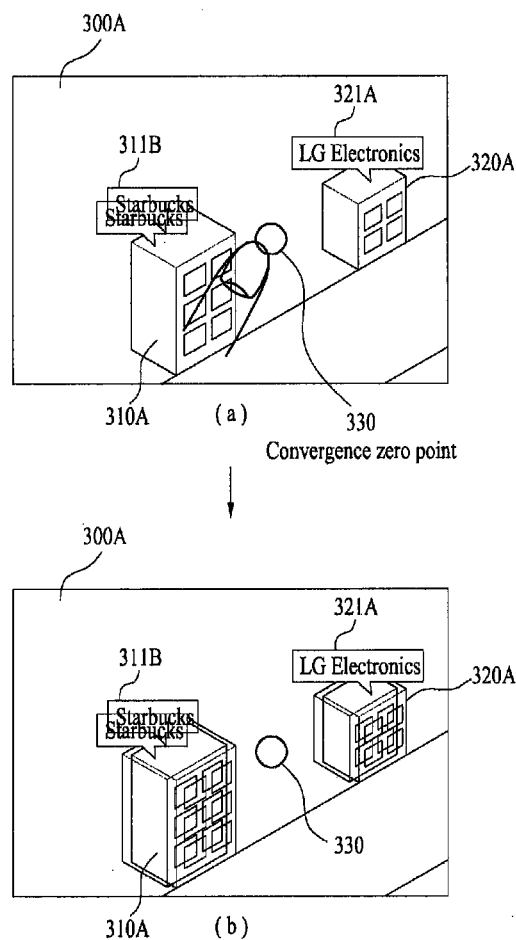

FIG. 14 and FIG. 15 are diagrams of screen configurations for a method of providing a 3D object and 3D object information within a 2D preview image for augmented reality according to a third embodiment of the present invention.

Referring to FIG. 14 (a), while a 2D preview image 300A is displayed, if a user selects a first object 310A within the 2D preview image 300A, the controller activates both of the first camera 121a and the second camera 121b.

The controller 180 converts the selected first object 310A and a first object information 311A to a 3D object 310B and a 3D object information 311B using a left eye image and a right eye image inputted from the first camera 121a and the second camera 121b, respectively and then displays the 3D object 310B and the 3D object information 311B.

In this case, as mentioned in the foregoing description with reference to FIG. 8, the controller 180 is able to stop displaying the rest of the object information 321A except the 3D object information 311B within the 2D preview image 300A.

And, the controller 180 is able to change at least one of the cubic effect level, the depth effect level and the size of each of the 3D object 310B and the 3D object information 311B according to one of the aforesaid processes shown in FIGS. 6 to 9.

Moreover, after the first object information 311A has been converted to the 3D object information 311B by one of the process shown in FIGS. 6 to 9, if a specific point 330 within the 2D preview image is selected [FIG. 15 (a)], the controller 180 respectively converts the objects 310A and 320A within the 2D preview image 300A to 3D objects 310R and 320R using the selected point 330 as a convergence zero point and then displays the 3D objects 310B and 320B [FIG. 15 (b)].

[Fourth Embodiment]

A fourth embodiment of the present invention relates to a process for dividing a screen of a touchscreen into a first region and a second region and then providing 2D objects, 2D object information, 3D objects and 3D object information to the first and second regions.

FIGS. 16 to 20 are diagrams of screen configurations for a method of providing 2D objects, 2D object information, 3D objects and 3D object information to first and second regions of a touchscreen according to a fourth embodiment of the present invention.

Figure 16:
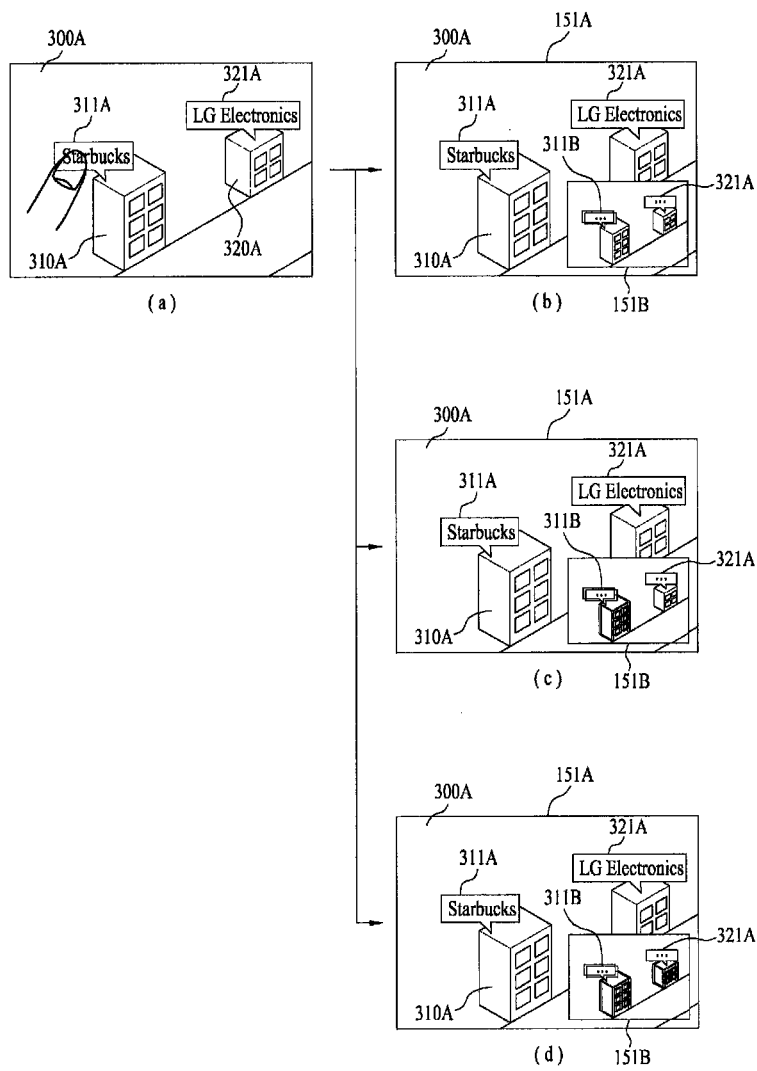
FIGS. 16 to 20 are diagrams of screen configurations for a method of providing 2D objects, 2D object information, 3D objects and 3D object information to first and second regions of a touchscreen according to a fourth embodiment of the present invention.

Referring to FIG. 16, if a first object information 311A within a 2D preview image 300A is selected [FIG. 16 (a)], the controller 180 divides a screen of the touchscreen 151 into a first region 151A and a second region 151B.

In doing so, the screen can be divided into the first and second regions 151A and 151B equal to each other in size. Alternatively, the screen can be divided in a manner that the second region 151B exists as a thumbnail in a small size within the first region 151A.

Subsequently, the controller 180 displays an original 2D preview image 300A on the first region 151A and displays a 3D object information 311B on the selected first object information 311A on the second region 151B [FIGS. 16 (b) to 16 (d)].

In particular, referring to FIG. 16 (b), the controller 180 converts the selected first object information 311A to a 3D object information 311B, displays the original 2D preview image 300A on the first region 151A, and displays a preview image containing the 3D object information 311B on the second region 151B.

Referring to FIG. 16 (c), the controller 180 converts the selected first object information 311A and the first object 310A to a 3D object information 311B and a 3D object 310B, respectively, displays the original 2D preview image 300A on the first region 151A, and displays a preview image containing the 3D object 310B and the 3D object information 311B on the second region 151B.

Referring to FIG. 16 (d), the controller 180 converts the selected first object information 311A and all objects 310A and 320A in the 2D preview image 300A to information and objects of 3D type, displays the original 2D preview image 300A on the first region 151A, and displays a preview image containing the 3D objects 310B and 320B and the 3D object information 311B on the second region 151B.

Optionally, if the first and second regions 151A and 151B are selected by a user in one of FIGS. 16 (b) to 16 (d), the controller 180 swaps to display the preview images displayed on the first and second regions 151A and 151B to each other [not shown in FIG. 16].

Figure 17:
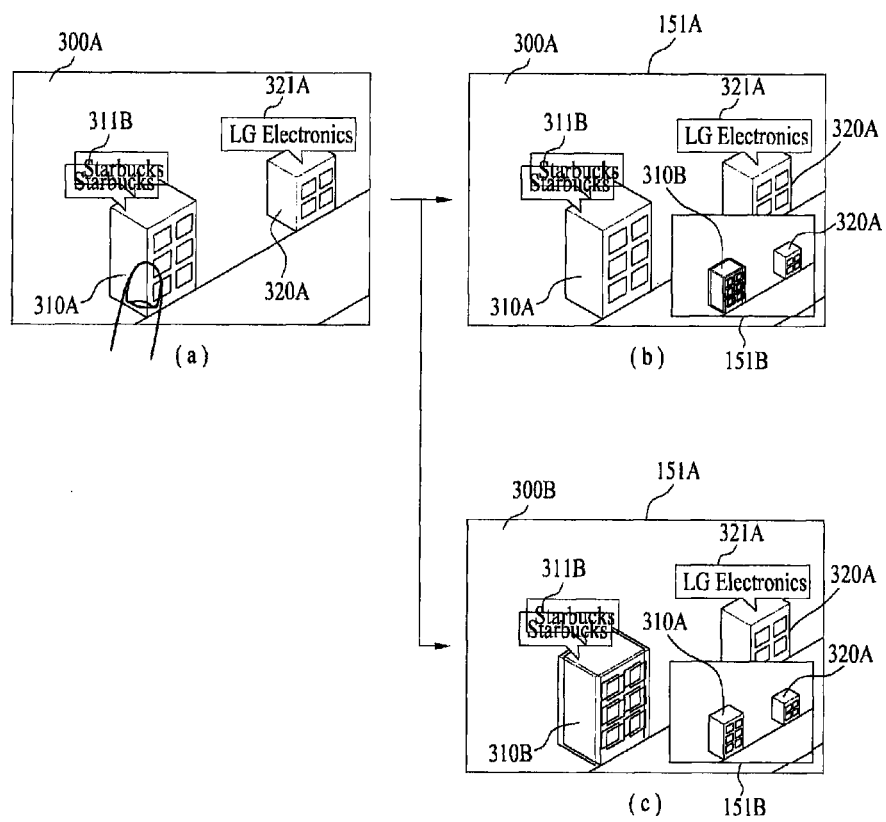

FIG. 17 (a) shows that the first object information 311A within the 2D preview image 300A is converted to the 3D object information 311B by one of the processes shown in FIGS. 6 to 9.

If the first object 310A is selected from the 2D preview image 300A, the controller 180 divides a screen of the touchscreen 151 into a first region 151A and a second region 151B [FIG. 17 (b)].

Subsequently, the controller 180 converts the selected first object to a 3D object 310B, displays a 2D preview image 300A having the 3D object 310B not contained on the first region 151A, and displays a preview image containing the 3D object 310B on the second region 151B.

Referring to FIG. 17 (c), the controller 180 converts the selected first object 310A to a 3D object 310B, displays a preview image 300A containing the 3D object 310B on the first region 151A, and displays a preview image not containing the 3D object 310B and the 3D object information 311B on the second region 151B.

Figure 18:
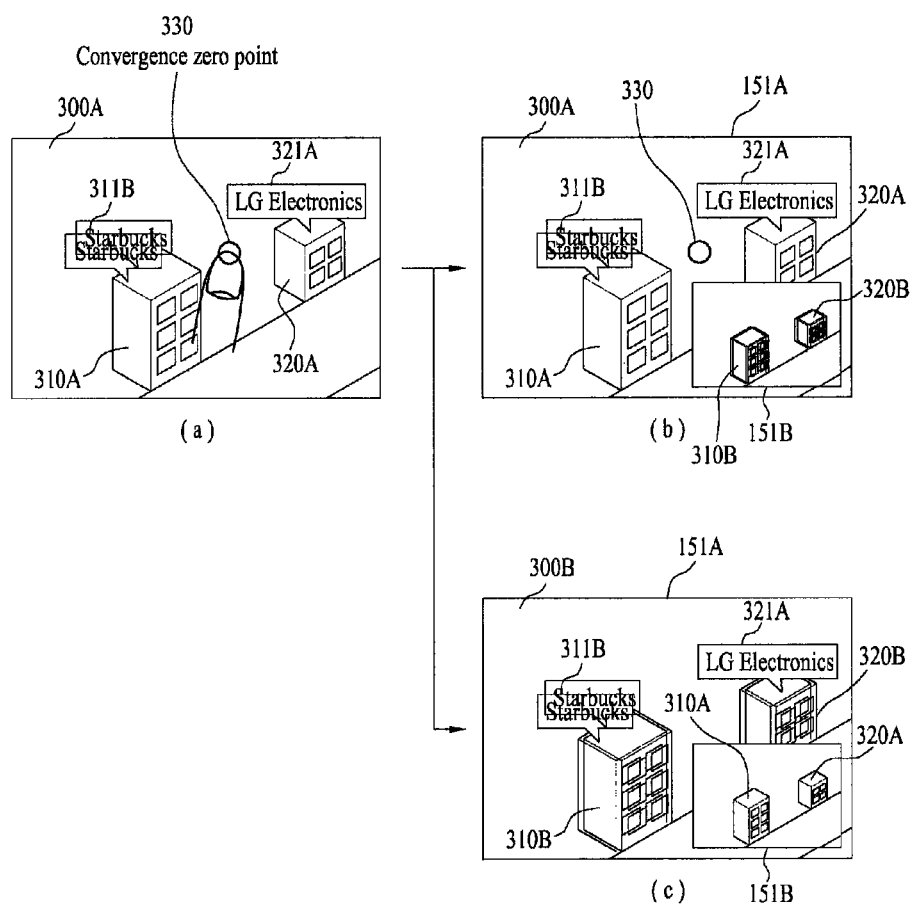

FIG. 18 (a) shows that the first object information 311A within the 2D preview image 300A is converted to the 3D object information 311B by one of the processes shown in FIGS. 6 to 9.

Referring to FIG. 18, if a specific point 330 within the 2D preview image 300A is selected [FIG. 18 (a)], the controller 180 converts objects 310A and 320A within the 2D preview image 300A to 3D objects 310B and 320B using the selected point 330 as a convergence zero point and is then able to display a preview image containing the 3D objects 310B and 320B on the first region 151A or the second region 151B [FIG. 18 (b), FIG. 18 (c)].

In particular, referring to FIG. 18 (b), the controller 180 the converts objects 310A and 320A to 3D objects 310B and 320B using the selected point 330 as a convergence zero point, display a preview image not containing the 3D objects 310B and 320B on the first region 151A, and displays a preview image containing the 3D objects 310B and 320B on the second region 151B.

Alternatively, referring to FIG. 18 (c), the controller 180 the converts objects 310A and 320A to 3D objects 310B and 320B using the selected point 330 as a convergence zero point, display a preview image containing the 3D objects 310B and 320B on the first region 151A, and displays a preview image not containing the 3D objects 310B and 320B on the second region 151B.

Figure 19:
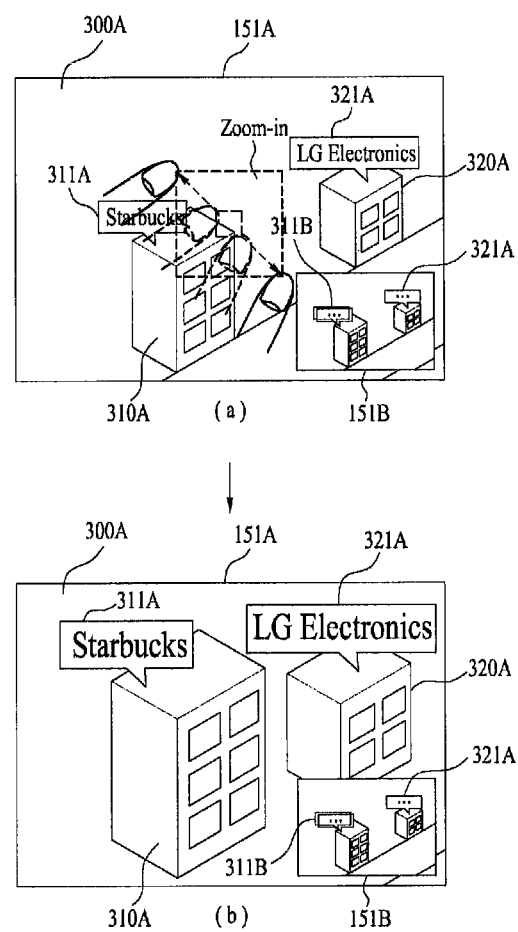

Meanwhile, referring to FIG. 19, while the preview images are displayed on the first region 151A and the second region 151B by one of the processes shown in FIGS. 16 to 19, if a command for a zoom power change of the first region 151A is inputted by a user [FIG. 19 (a)], the controller 180 does not change the zoom power of the second region 151B but applies the zoom power to the first region 151A corresponding to the zoom power change command [FIG. 19 (b).

For example, referring to FIG. 19, if a zoom-in command for the first region 151A is inputted, the second region 151B remains intact but the first region 151A is zoomed in.

Figure 20:
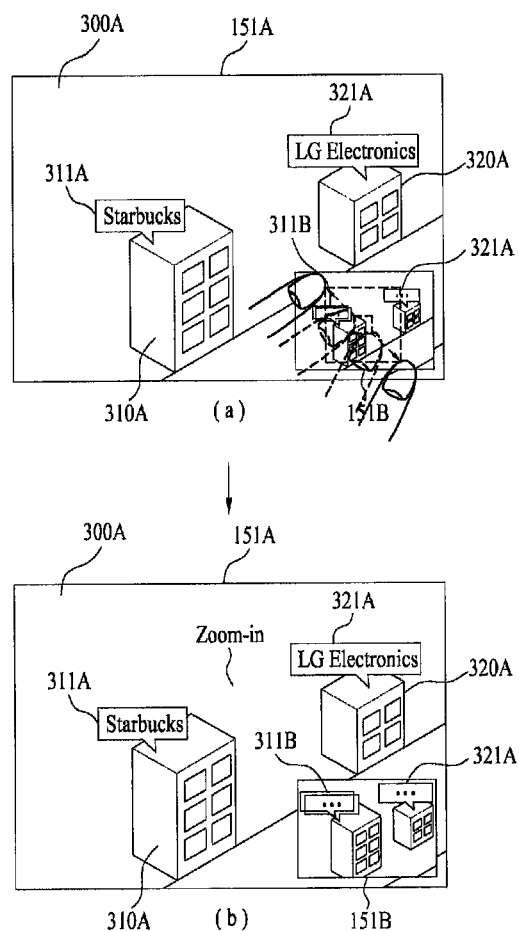

Meanwhile, referring to FIG. 20, while the preview images are displayed on the first region 151A and the second region 151B by one of the processes shown in FIGS. 16 to 19, if a command for a zoom power change of the second region 151B is inputted by a user [FIG. 20 (a)], the controller 180 does not change the zoom power of the first region 151A but applies the zoom power to the second region 151B corresponding to the zoom power change command.

For example, referring to FIG. 20, if a zoom-in command for the second region 151B is inputted, the first region 151A remains intact but the second region 151B is zoomed in.

Besides, while the preview images are displayed on the first region 151A and the second region 151B by one of the processes shown in FIGS. 16 to 20, if a command for photographing is inputted, the controller 180 synthesizes the preview images displayed on the first and second regions 151A and 151B together and is then able to store them as a single file.

The controller 180 controls the preview images displayed on the first and second regions 151A and 151B to be separately stored in a manner of being linked to each other. In this case, the linked preview images can be separately displayed in a manner of being respectively executed. Alternatively, when one of the preview images is executed, the other preview image linked to the executed preview image can be displayed together with the executed preview image.

If the first region 151A or the second region 151B is selected, the controller 180 is able to control the preview image displayed on the selected region to be stored.

Accordingly, the present invention provides the following effects and/or advantages.

First of all, the present invention converts a preview image for augmented reality to a 2D or 3D image and also converts information on an object within the preview image to a 2D or 3D image, thereby providing a user with various images in the augmented reality.

It will be apparent to those skilled in the art that various modifications and variations can be specified into other form (s) without departing from the spirit or scope of the inventions.

In addition, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, the computer can include the controller 180 of the terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
   at least one camera;
   a location unit to determine a current location of the mobile terminal;
   a touchscreen to display a preview image obtained by the camera; and
   a controller to:

search for object information of an object within the preview image based on the determined current location of the mobile terminal, display the object information obtained by the searching while displaying a portion of the preview image, receive a first touch input on the touchscreen at a specific point, change the displayed object information to perceived 3-dimensional (3D) object information in response to receiving the first touch input at the specific point, receive a second touch input at the displayed 3D object information, and change a display characteristic of the displayed 3D object information based on the second touch input at the displayed 3D object information, wherein changing the display characteristic includes the controller changing at least one of a cubic effect level or a depth effect level.

2. The mobile terminal of claim 1, wherein the specific point corresponds to the object information.

3. The mobile terminal of claim 2, wherein the controller displays a plurality of object informations within the preview image, and wherein changing the displayed object information to the perceived 3D object information includes the controller displaying the 3D object information and removing the remainder of the object informations within the preview image.

4. The mobile terminal of claim 2, wherein after displaying the 3D object information, when a command for photographing the preview image is received, the controller stores the preview image and the 3D object information.

5. The mobile terminal of claim 4, wherein the controller stores the preview image and the 3D object information by synthesizing the 3D object information with the preview image.

6. The mobile terminal of claim 4, wherein the controller separately stores the preview image and the 3D object information as separate files by linking the preview image and the 3D object information, and the controller displays both the stored preview image and the stored 3D object information.

7. The mobile terminal of claim 1, wherein the at least one camera includes a first camera to photograph a left eye image for a perceived 3D image and a second camera to photograph a right eye image for the perceived 3D image.

8. The mobile terminal of claim 7, wherein the preview image includes a perceived 3D preview image that is generated based on the left eye image and the right eye image.

9. The mobile terminal of claim 7, wherein the specific point corresponds to an object, and wherein the controller displays a perceived 3D object based on the left eye image and the right eye image.

10. The mobile terminal of claim 7, wherein the specific point corresponds to an object, and wherein the controller divides a screen of the touchscreen into a plurality of regions that includes a first region and a second region, the control displays a previous preview image on the first region, and displays a preview image that includes the 3D object information on the second region.

11. The mobile terminal of claim 10, wherein when the object within the first region is touched, the controller converts an object similar to the touched object within the second region to a perceived 3D object based on the left eye image and the right eye image.

12. The mobile terminal of claim 10, wherein when a zoom power change command for either the first region or the second region is inputted, the controller applies the zoom power to the region corresponding to the zoom power change command and maintains a zoom power of the region not corresponding to the zoom power change command.

13. The mobile terminal of claim 10, wherein when a command for photographing either the first region or the second region is inputted, the controller stores the preview image within the region corresponding to the photographing command.

14. A method of controlling a mobile terminal, the method comprising:

displaying, on a touchscreen, a preview image obtained via at least one camera determining a current location of the mobile terminal;

searching for an object information relating to an object within the preview image based on the determined current location;

displaying the object information obtained by the searching;

receiving a first touch input on the touchscreen at a specific point;

changing the displayed object information at the specific point to a perceived 3-dimensional (3D) object information in response to receiving the first touch input;

receiving a second touch input at the displayed 3D object information; and changing a display characteristic of the displayed 3D object information based on the second touch input at the displayed 3D object information, wherein changing the display characteristic includes changing at least one of a cubic effect level or a depth effect level.

15. The method of claim 14, wherein the specific point corresponds to the object information.

16. The method of claim 15, wherein the preview image includes a plurality of object informations, and wherein the controller stops displaying the remainder of the object informations other than the converted 3D object information within the preview image.

17. The method of claim 15, wherein after displaying the 3D object information, the method further comprises receiving a command for photographing the preview image, and storing the preview image and the 3D object information.

18. The method of claim 17, wherein the preview image and the 3D objection information are stored by synthesizing the 3D object information and the preview image.

19. The method of claim 17, wherein the preview image and the 3D object information are stored as separate files by linking the preview image and the 3D object information.

20. The method of claim 14, wherein the specific point corresponds to an object.

21. The method of claim 14, wherein the specific point corresponds to an object, and displaying the 3D information includes dividing a screen of the touchscreen into a plurality of regions that includes a first region and a second region, wherein a previous preview image is displayed on the first region, and a preview image that includes the 3D object is displayed on the second region.

22. A mobile terminal to display images using augmented reality comprising:

a camera;

a screen to display a real image obtained by the camera and to display augmented information using augmented reality; and a controller to:
obtain object information for an object displayed in the image, display, in augmented reality, the obtained object information and a portion of the real image, receive a first touch input on the screen at a specific point, changing the displayed object information to a perceived 3-dimensional (3D) object image displayed in augmented reality in response to receiving the first touch input while displaying a portion of the real image, receive a second touch input at the displayed 3D object information, and change a display characteristic of the displayed 3D object information based on the second touch input at the displayed 3D object information, wherein changing the display characteristic includes the controller changing at least one of a cubic effect level or a depth effect level.

23. The mobile terminal of claim 22, wherein the specific point corresponds to the object information.

24. The mobile terminal of claim 22, wherein the specific point corresponds to an object.

\* \* \* \* \*